United States Patent [19]

Trott

[11] E Re. 30,829

[45] Reissued Dec. 22, 1981

[54] CASING PERFORATION METHOD AND APPARATUS

[75] Inventor: Donald E. Trott, Victoria, Tex.

[73] Assignee: D & D Company, Victoria, Tex.

[21] Appl. No.: 62,014

[22] Filed: Jul. 30, 1979

Related U.S. Patent Documents

Reissue of:

[64] Patent No.: 4,113,016
Issued: Sep. 12, 1978
Appl. No.: 836,758
Filed: Sep. 26, 1977

[51] Int. Cl.[3] ..... E21B 29/00

[52] U.S. Cl. ..... 166/297; 166/55.1; 175/4.56

[58] Field of Search ..... 166/297, 55, 55.1, 63; 175/2, 4.54, 4.56; 102/21.2, 21.8, 21

[56] References Cited

U.S. PATENT DOCUMENTS

| | | | |
|---|---|---|---|
| 1,875,583 | 9/1932 | Fox | 166/299 |
| 2,986,214 | 5/1961 | Wiesman, Sr. et al. | 166/297 |
| 3,058,523 | 10/1962 | McElheny | 175/4.52 |
| 3,912,013 | 10/1975 | Vann | 166/297 |
| 3,957,115 | 5/1976 | Kerzee | 166/297 |
| 3,990,507 | 11/1976 | Vann | 166/297 |

*Primary Examiner*—James A. Leppink
*Attorney, Agent, or Firm*—Richards, Harris & Medlock

[57] ABSTRACT

Method and apparatus for effecting perforation of a well casing with a casing gun while maintaining pressure in the well bore at a lower level than the pressure in the surrounding reservoir at the point of perforation. Before production tubing is run into the well, the casing gun is deposited in the bore below the desired production level. After the tubing is installed, borehole pressure is reduced to the desired level by swabbing the tubing and an automatic coupling and decoupling pickup tool is lowered on a wireline through the tubing and attached, mechanically and electrically, to the casing gun. The casing gun is then raised to the production level, as measured by locating the casing collars. Whe the gun is properly located, it is activated through an electrical cable carried along with the wireline. The casing gun perforates the well casing and surrounding formation, and is then decoupled from the wireline to be left in the well.

13 Claims, 8 Drawing Figures

CASING PERFORATION METHOD AND APPARATUS

Matter enclosed in heavy brackets [ ] appears in the original patent but forms no part of this reissue specification; matter printed in italics indicates the additions made by reissue.

BACKGROUND OF THE INVENTION

The present invention pertains to oil and gas production, and more particularly, to well completion.

After an oil or gas well is drilled and casing is installed, it is necessary to perforate the casing at the location of the oil or gas-bearing strata. Casing is perforated by either firing projectiles or by exploding a shaped charge. There are two main types of perforation devices; the tubing gun, which is lowered through the production tubing; and the casing gun, which is run into the well before the tubing is installed. The casing gun is larger and substantially more effective than the tubing gun, but the casing gun can be installed only when the tubing is not in place in the well.

When the well casing is perforated, it is often desirable to have the pressure within the well bore at a lower level than the pressure of the adjacent oil or gas-bearing strata so that the hydrocarbon products will flow rapidly into the well bore initially cleaning out the perforation holes and thence up to the surface due to the strata pressure alone. In many instances, the well bore is filled with drilling mud, salt water or other fluids which form a hydrostatic pressure head that inhibits the flow of hydrocarbons from the formation into the bore. The hydrostatic pressure may be so great as to force the fluid from the well into the formation thereby contaminating the area adjacent the well bore and inhibiting the flow of hydrocarbons. Therefore, in many cases, it is desirable to have a pressure differential toward the well bore to promote the flow of hydrocarbons into the well, especially at the time of perforating the well casing.

In U.S. Pat. No. 2,906,339 issued to Griffin, there is shown a method and apparatus for perforating well casing. This method shows the conventional technique of positioning a casing perforator by attaching the perforator to the lower end of the production tubing string and lowering the tubing string into the casing. When the perforator gun is in position, it is activated by dropping a weighted explosive charge through the tubing.

U.S. Pat. No. 3,706,344 to Vann likewise shows the method of positioning a casing perforator by joining the perforator to the end of the tubing string. After the tubing string is lowered into the casing to the predetermined depth, the perforator is activated.

In both of the above patents, the casing gun is positioned by manipulating the tubing string, an awkward and imprecise procedure. Therefore, there is a need for a method and related apparatus for easily and accurately positioning a casing gun perforator in a well while the production tubing is fixed in place and with a pressure differential toward the well bore.

SUMMARY OF THE INVENTION

In accordance with the present invention there is provided a method and apparatus for perforating a well casing with a large diameter casing gun perforator while at the same time maintaining a pressure differential to induce the flow of hydrocarbons from the surrounding formation into the well bore.

After the production casing is installed and cemented in a well bore, a radiactivity log is run to determine the depth of the oil or gas-bearing strata and to correlate this depth to the casing collars. A casing gun is attached to a wireline by means of an automatic coupling and decoupling pickup tool and lowered to a position below the level of the strata where it is deposited on the well floor. Production tubing is installed within the casing along with a packer, which is set immediately above the level of the oil or gas-bearing strata. Once the tubing is in place, the well is swabbed to lower the fluid level in the well to effect the desired pressure differential at the level of the producing strata.

After the fluid level in the well is lowered, a wireline carrying an electrical conductor, a collar locator, and the pickup tool is passed through the production tubing and attached to the previously-installed casing gun. The gun is lifted by means of the wireline and positioned through use of the collar locator to the level of the oil or gas-bearing strata as indicated by the previously-run log. Once in position, the casing gun is activated and the casing is perforated. The reduced pressure due to the swabbing causes the hydrocarbons within the strata to initially flow through the perforations at a very rapid rate thus cleaning out the perforations and allowing a greater flow of hydrocarbons through them and upward through the production tubing. After the perforation, the casing gun is lowered to the bottom of the well bore where it is released from the pickup tool. The wireline and pickup tool are removed from the production tubing, which is under pressure, by commonly used equipment while the casing gun is left in the well bore.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE PREFERRED EMBODIMENT

After an oil well has been drilled and production casing has been installed in the borehole, it is necessary to perforate the casing in the vicinity of the oil or gas-bearing strata to enable the hydrocarbons present in the formation to flow into the well bore. A radioactive log is generally taken with the production casing in place for the purpose of precisely locating the production formation in relation to the casing collars to provide a precise method for locating the formation. There are a number of factors which must be considered in performing the perforation process. Of the types of perforation guns available, casing and tubing, it is generally more desirable to use a casing gun, since this type of gun has greater power and can penetrate through the casing and deeper into the formation than can the smaller tubing gun. The larger holes and deeper penetration produced by the casing gun reduce the resistance to flow of hydrocarbons and thereby increase the production rate.

In many cases the well bore is filled with fluids such as water, drilling mud or oil. Some types of these materials, if allowed to leak into the formation, can cause contamination that seriously reduces or even eliminates the flow of hydrocarbons into the well bore. Therefore, in situations where it is possible to have such contamination, it is necessary to insure that the pressure within the well bore is less than the pressure in the formation at the time of perforation so that any material is swept up into the well bore rather than being forced into the production strata. It is also desirable to have such a pressure differential in order to more completely clean the perforation at the initial rapid flow. This pressure differential can be produced by swabbing the tubing to remove the fluids present or any other method but in order to do so, the tubing must be present in the casing to control the resulting pressure. But, if the tubing is installed prior to the perforation process, it is not possible to run in a casing perforator gun since it is too large to pass through the tubing.

The process in accordance with the present invention makes possible the use of a casing perforator gun together with production tubing, which can be swabbed to produce a pressure differential. Precise placement for the casing gun can be achieved without the manipulation of the tubing string required in the prior art.

Figure 1:
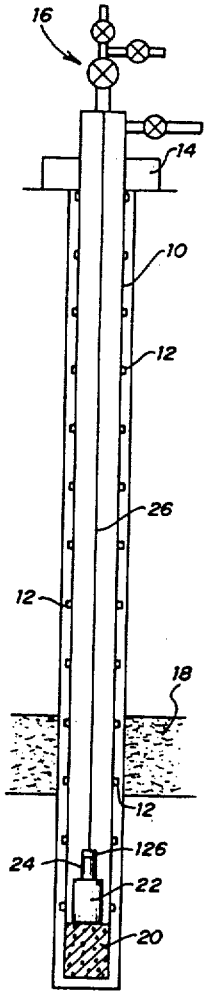
FIG. 1 is a vertical section view taken through a well casing showing the installation of a perforating gun in the well bore.

Referring to FIG. 1, there is illustrated a conventional well bore with a string of production casing 10 installed therein. Segments of casing are joined together at casing collars 12 to form the entire length of casing 10. The casing 10 is supported by a well head 14 and is connected to a Christmas tree 16 comprising a set of control valves. The casing 10 passes through an oil or gas-bearing strata 18 and downward to the cement plug 20 left in the bottom joint of casing.

As the first step in the process of perforating the casing 10, a casing perforator 22 is lowered into the well bore by means of a pickup tool 24 supported by a wireline 26. Casing perforator 22 is any type of casing penetration device; the most common of these devices use either projectiles or shaped explosives to break through the casing wall. The number and distribution of charges is set into the casing perforator 22 by operators on the surface. The casing perforator 22 is lowered past the oil or gas-bearing strata 18 and deposited at the bottom of the well on the cement plug 20. As an alternative step, the casing perforator 22 can be lowered past the oil-bearing strata 18 and fixed in position against the walls of the casing 10 at a point above the cement plug 20. Or, the casing gun 22 can be dropped down the casing 10 to the cement plug 20 if means are provided for slowing the fall.

Figure 2:
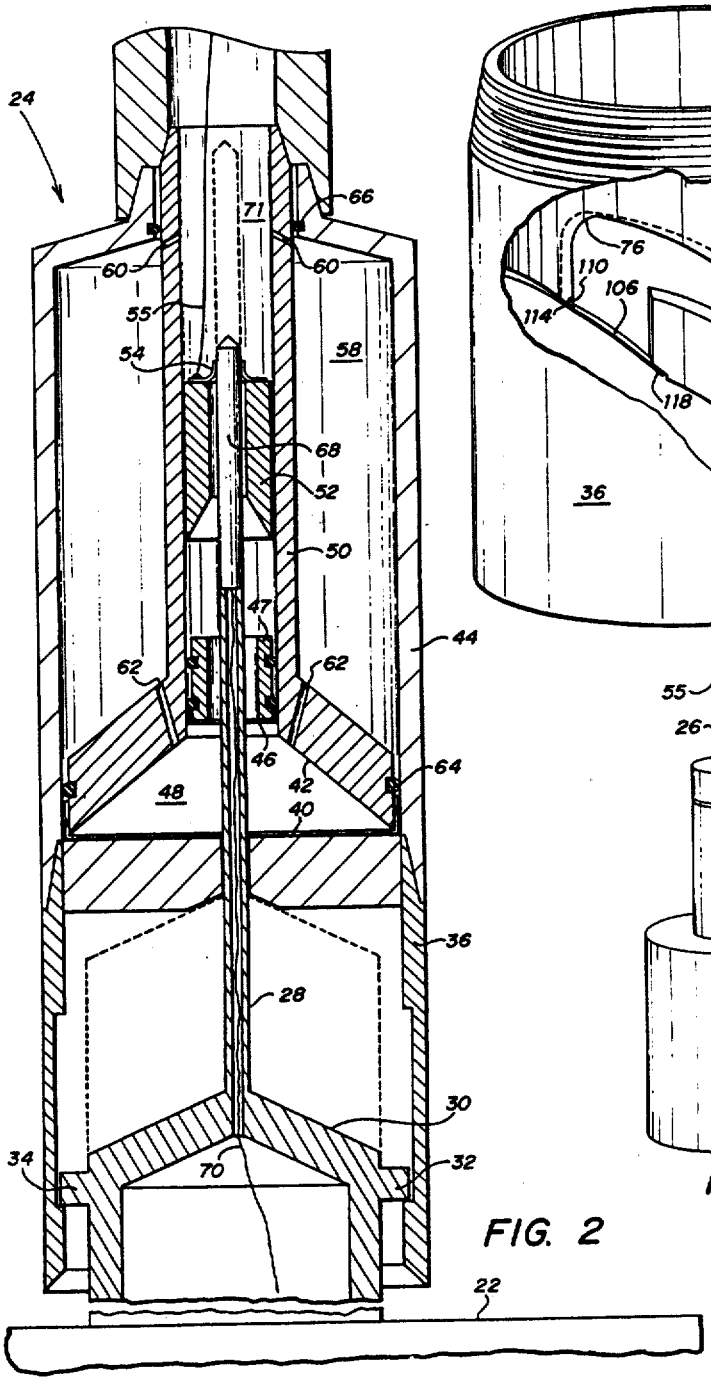
FIG. 2 is a cross-section view of a coupling/decoupling tool.

The pickup tool 24 is illuatrated in greater detail in FIG. 2. This device provides a means for depositing the casing perforator 22 at the bottom of the well by releasing the wireline 26 from the casing perforator 22. The apparatus is designed so that the pickup tool 24 can later be lowered on the wireline 26 and reconnected to the casing perforator 22 to lift it to the desired level.

Casing perforator 22 has a vertically disposed probe 28 that projects upward and mates with the pickup tool 24. Supporting the probe 28 is a turret 30 on which are mounted opposing studs 32 and 34. These studs mate with a skirt 36, which is further described in FIGS. 3 and 4. Interaction of the studs 32 and 34 with the skirt 36 produces alternate coupling and decoupling of the pickup tool 24 with the casing perforator 22. The bottom of turret 30 is designed for mechanical and electrical attachment to any commonly used casing gun perforator.

Above the skirt 36 on the pickup tool 24 is a diaphragm 40 which is disposed on the lower end of a conical receptor 42, which is disposed within a tubular member 44. The upper, exterior portion of the pickup tool 24 above the skirt 36 comprises the tubular member 44 the upper portion of which attaches mechanically and electrically to any commonly used collar locator. Covering the interior central passageway of the conical receptor 42 is a second diaphragm 46 supported by a tubular member 47. A conical chamber 48 is thus formed by the diaphragm 40, the conical receptor 42 and the diaphragm 46.

Joined to the top of the conical receptor 42 is a second tubular member 50, the interior of which is isolated from the conical chamber 48 only by means of the diaphragm 46.

A tubular electrical insulator 52 is disposed within the second tubular member 50 and is shaped to have a conical surface on its end closest to the diaphragm 46. Attached to the tubular insulator 52 is a spring metal sheet electrical contact 54. Electrical contact 54 is connected to an electrical cable 55.

The first tubular member 44 and the second tubular member 50 form an annular chamber 58 which is in fluid communication with the interior of the second tubular member 50 through ports 60. The annular chamber 58 is also in fluid communication with the conical chamber 48 through ports 62. Conical receptor 42 is sealed in relation to the first tubular member 44 by means of an O-ring 64, and the second tubular member 50 is sealed in relation to the first tubular member 44 by means of an O-ring 66. The conical chamber 48 and the annular chamber 58 and cylindrical space 71 are filled with a nonconducting fluid, preferably a light oil.

In many instances, the borehole of an oil or gas well is filled with salt water, which is an electrical conductor. In order to activate the explosives within the casing perforator 22 it is necessary to form an electrical connection to the igniter therein (now shown). But the presence of the salt water makes it very difficult to form an electrical connection to the igniter without having the electrical connection short out to ground through the salt water. The present invention provides apparatus for establishing such an electrical connection depsite the submersion of the casing perforator 22 and the pickup device 24 within salt water. This is accomplished by lowering the pickup tool 24 onto the probe 28 which then perforates the diaphragm 40 and enters into the conical chamber 48. Since the probe is entering into the chamber 48 and is compressing the diaphragm, the pressure within the conical chamber 48 is higher than that of the surrounding fluid and therefore any leakage will be of nonconducting oil from the chamber 48 outward, thus no salt water will enter into the conical chamber 48. As the pickup tool 24 is further lowered the probe 28 contacts the diaphragm 46 and likewise perforates it. This diaphragm provides a second barrier for preventing the leakage of salt water into the device. Probe 28 displaces light oil in chamber 71 through ports 60 to chamber 58 and then through ports 62 to chamber 48. If salt water should enter chamber 48, such as after repeated coupling operations, the oil will move to the top of the chamber and force the salt water to the bottom of the chamber where it will not interfere with the electrical contact. As the probe 28 continues upward it contacts the tubular electrical insulator 52 which centers the probe 28 within the second tubular member 50. Pickup tool 24 is lowered until the studs 32 and 34 engage the skirt 36. This structure makes possible numerous couplings and decouplings to effect electrical connections.

On the exterior of the probe 28 is an electrical conducting surface 68 which is connected through a wire 70 to an ignition device in the casing perforator 22. As the probe 28 passes through the tubular electrical insulator 52 the electrical conducting surface 68 comes into contact with the electrical contact 54 and is held against the contact by means of the spring action of the sheet comprising electrical contact 54. Thus, the electrical cable 55, which is connected to the operator's control panel at the surface, is joined through the electrical contact 54 to an electrical conductor 70 and thence to the ignition device in the casing perforator 22. Thus, as connected, an operator on the surface can activate the explosives within the casing perforator 22.

Figure 4:
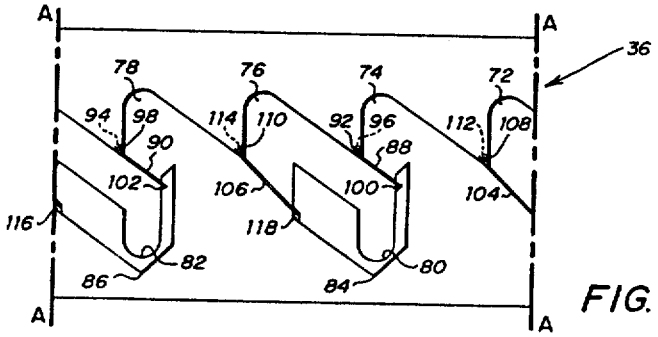
FIG. 4 is an elevation view of the interior of the mechanical coupling segment shown in FIG. 3. In this view the tubular member has been split vertically and rolled flat to better illustrate the interior structure.
Figure 3:
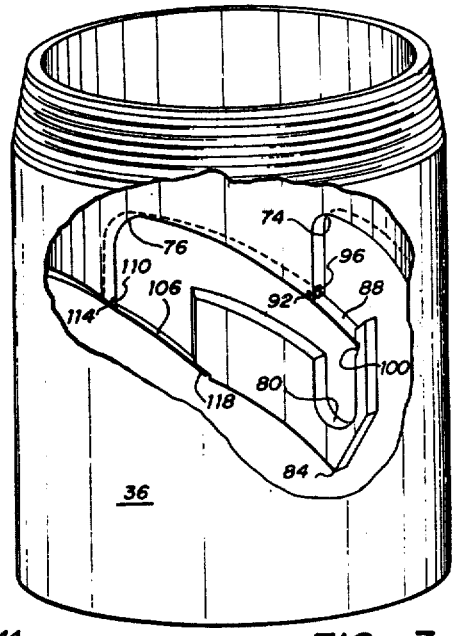
FIG. 3 is a cut-away view of the mechanical coupling segment of the tool shown in FIG. 2.

FIGS. 3 and 4 illustrate the operation of the skirt 36 in relation to the turret 30 and the studs 32 and 34. FIG. 4 is a view of the interior of skirt 36 as it would appear if the skirt 36 were split along line A—A and rolled flat. On the interior of the skirt 36 are a set of contiguous first slots 72, 74, 76 and 78. These slots are formed by milling the interior surface of the skirt 36. A set of second slots 80 and 82 are formed in the same manner with these slots open toward slots 74 and 78. Located below each of the slots 80 and 82 are camming surfaces 84 and 86. Disposed between the oppositely opposed first slots and second slots are a set of pivot arms 88 and 90 which are pivoted with hinges 92 and 94 respectively. Pivot arms 88 and 90 are tensioned upward toward slots 74 and 78 by springs 96 and 98 but are held in position by recesses 100 and 102. Thus, the pivot arms 88 and 90 can swing only downward toward the slots 80 and 82.

A second set of pivot arms 104 and 106 operate much like the first set. The second pivot arms are pivoted respectively at hinges 108 and 110 and are forced by springs 112 and 114 against the recesses 116 and 118 respectively in camming surfaces 86 and 84. Thus the pivot arms 104 and 106 can swing only downward away from the first slots 72 and 76.

In operation the skirt 36 is lowered over the turret 30 which is guided in by the probe 28. As the skirt is lowered, the studs 32 and 34 strike either the camming surfaces 84 and 86, the pivot arms 104 and 106 or the slots 74 and 78. If the studs 32 and 34 strike the camming surfaces 84 and 86, the skirt or studs are forced to rotate so that the studs either slide upward against the pivot arms 104 and 106 or up into the slots 74 and 78. If the studs do strike the pivot arms 104 and 106, they continue to slide upward into the slots 74 and 78. Once the studs mate with the slots 74 and 78, the skirt 36 can be lowered no further. When an upward force is applied to the skirt, the pivot arms 88 and 90 will be raised until they contact the studs 32 and 34. The arms 88 and 90 will pivot downward under the pressure of the studs 32 and 34 thus allowing the studs to drop down into the slots 80 and 82. When the studs have reached the bottom of the slots 80 and 82, the skirt will then lift the studs together with the turret 30 which in turn will lift the casing perforator 22.

Figure 5:
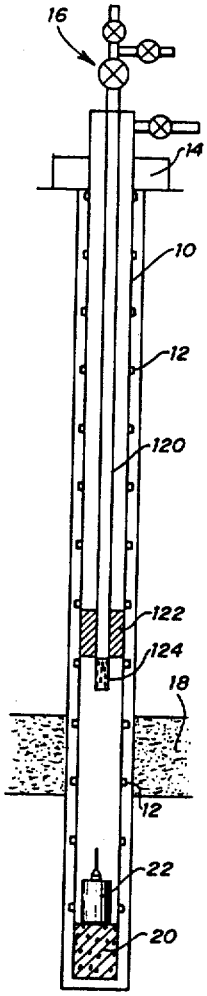
FIG. 5 is a vertical section view taken through a well casing showing production tubing together with a packer installed above the producing strata.

After the casing perforator 22 has been activated and the casing has been perforated, as described below, it is necessary to remove the casing perforator from the wireline since the casing perforator 22 is too large to be withdrawn through a string of tubing 120, which is shown in FIG. 5. Thus, the casing perforator 22 must be decoupled from the pickup tool 24. This procedure is described in reference to FIGS. 3 and 4. As long as the casing perforator 22 is suspended by the skirt 36, the studs 32 and 34 are positioned within the slots 80 and 82. When the casing perforator 22 is lowered to the floor of the well, the skirt 36 continues downward and the studs move upward relative to the skirt. As the skirt moves downward, the studs strike the pivot arms 88 and 90 and are forced to slide into the slots 72 and 76. When the skirt 36 is at its lowest position, the studs 32 and 34 will be positioned at the top of the slots 72 and 76. When the skirt 36 is again lifted upward, the pivot arms 104 and 106 will be brought up until they contact the studs 32 and 34. These arms are pivoted to open downward, thus allowing the studs to pass without exerting any significant force on them. When the studs have passed the pivot arms 104 and 106 the skirt is then free of the studs and can be lifted without further contact. Thus, the casing perforator 22 has been decoupled from the pickup tool 24. The pickup tool 24 which is attached to the wireline 26 can then be withdrawn through the tubing 120, shown in FIG. 5, and removed from the well. The casing perforator 22 is left at the bottom of the well bore and can be removed at a future date if the tubing string is pulled from the well. It can be seen from the above action that the casing perforator 22 is alternately decoupled and then coupled to the pickup tool 24 to effect the desired depositing and recovery of the casing perforator 22 in accordance with the casing perforation method of the present invention.

Returning to the method of perforating the casing as shown in FIG. 5. After the casing perforator 22 is deposited in the well bore prior to perforating, the pickup tool 24 is disconnected from the casing perforator 22 and removed from the well by means of the wireline 26. Production tubing 120 together with a packer 122 is run into the casing 10. The tubing 120 extends down to the vicinity of the oil or gas-bearing strata 18 and the packer 122 is set a short distance above the oil or gas-bearing strata 18. A short joint of perforated tubing 124 may be run below the packer 122. Packer 122 is locked into position so as to form a pressure seal that prevents the passage of fluid or gases between the lower region of the borehole and the annulus region between the tubing 120 and the casing 10.

The pressure in the casing 10 in the vicinity of the oil or gas-bearing strata 18 is reduced by removing the fluid from the tubing 120 to a depth which will result in the desired pressure differential. This is done by swabbing the tubing 120 in a conventional manner to lift out the fluid from tubing 120. The process of swabbing comprises running a swabbing tool into the tubing 120 and down below the quantity of fluid to be removed. As the swabbing tool is pulled upward, it forms a seal against the inner surface of the tubing. This seal causes the swabbing tool to lift the fluid above it up and out of the tubing as the swabbing tool is pulled to the surface. Through swabbing, the pressure in the region near the oil or gas-bearing strata 18 can be reduced down to any level desired. An alternative method for reducing the pressure comprises removing the fluid from the casing and tubing by gas displacement. As noted above, this pressure reduction develops a differntial pressure from the oil or gas strata to the well bore and prevents the contamination of the oil or gas-bearing strata 18 and increases the flow of hydrocarbons into the casing 10 and up the tubing 120 due to the rapid surge of fluid into the well bore.

Figure 6:
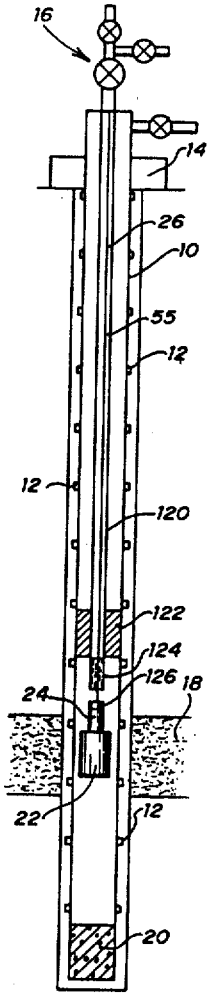
FIG. 6 is a vertical section view taken through a well casing showing the positioning of a perforating gun at the level of the producing strata.

When the tubing has been swabbed to reduce the hydrostatic head to the desired amount, the wireline 26 containing the electrical cable 55, the pickup tool 24 and a collar locator 126, as shown in FIG. 6, are run into the tubing 120. Wireline 26 is lowered so that pickup tool 24 contacts the casing perforator 22 and makes connection to it, as described above.

Figure 7:
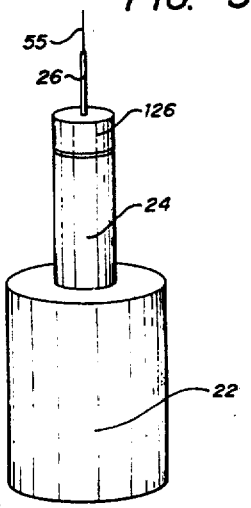
FIG. 7 is a perspective view of a wireline joined to the coupling/decoupling tool, a collar locator, and the perforating gun.

The casing perforator 22, pickup tool 24 which contains the electrical cable 55 that passes through the collar locator 126 to wireline 26, are shown in greater detail in FIG. 7.

After the casing perforator 22 is connected to the pickup tool 24, the perforator is lifted upward and the collars on casing 10 are sensed by the collar locator 126, as shown in FIG. 6. By locating several collars and correlating this information with the location of the collars shown on the radioactivity log run in the well, it is possible to precisely locate the casing perforator 22 at the proper level of the oil or gas-bearing strata 18. Wireline 26 can easily be raised and lowered to properly position the casing perforator 22. This procedure is well known to the industry and substantially simpler and more accurate than the prior art process wherein the casing perforator 22 is joined to the lower end of the tubing 120 and the tubing is manipulated to set the perforator for the appropriate depth. The present procedure is also substantially easier and more accurate than the prior art procedure which locates the oil or gas-bearing strata by measuring the lengths of tubing as they are run into the well carrying the casing perforator.

Figure 8:
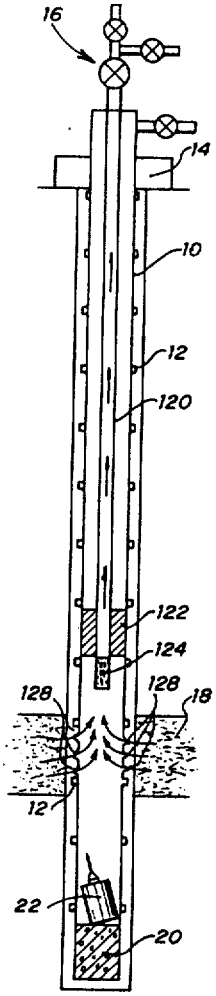
FIG. 8 is a vertical section view taken through a well casing showing the perforations and fluid flow resulting from firing of the perforation gun.

Following the detonation of the explosives within the casing perforator 22, as illustrated in FIG. 8, the walls of the casing 10 will be punctured to produce perforations 128, thus allowing communication between the oil or gas-bearing strata 18 and the interior of the casing 10. After the charges are detonated, the casing perforator 22 is lowered to the bottom of the hole and released from the pickup tool 24, whereupon the wireline 26 containing the electrical cable 55, collar locator 126 and pickup tool 24 are withdrawn from the well through the tubing 120. As an alternative method, as explosive is included between the pickup tool 24 and the casing perforator 22 to severe the connection between these two devices at the time of the perforation explosion and cause the casing perforator 22 to fall to the bottom of the borehole. Casing perforator 22 is left in the borehole while the well is being produced, but can be removed if the tubing 112 is pulled at some later time.

Since the pressure in the casing 10 was reduced by swabbing the tubing 120, or by other means, to a lower level than the pressure within the oil or gas-bearing strata 18, no contaminant will be carried into the oil or gas-bearing strata 18 from the well bore. The pressure differential also enhances the flow of hydrocarbons into the well bore by the cleaning action of the initial surge.

Thus, in accordance with the present invention, there is provided a method for completing a well with a casing gun perforator while using production tubing to maintain a desired pressure differential from the formation to the well bore.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. A method for perforating the casing of a well at a predetermined strata with a perforator means, comprising the steps of:

(a) depositing said perforator means within said casing [below said strata], (b) installing a tubing string with an attached packer within said casing, (c) joining a wireline to said perforator means, (d) positioning said perforator means at the level of said strata by means of said wireline, and (e) activating said perforator means.

2. A method for perforating the casing of a well as recited in claim 1 wherein the step of installing a tubing string comprises:

(a) running said tubing string and said packer into said casing, and (b) setting said packer in said casing at a depth above said strata to form a fluid flow path which communicates the interior of said casing below said packer with the interior of said tubing.

3. A method for perforating the casing of a well as recited in claim 1 further including the step of swabbing said tubing to remove fluid from said well.

4. A method for perforating the casing of a well as recited in claim 1 further including the step of removing fluid from said tubing and said casing by displacing said fluid with a gas.

5. A method for perforating the casing of a well as recited in claim 1 further including the steps of:

(a) disconnecting said wireline from said perforator means after the activation of said perforator means, and (b) removing said wireline from said tubing string.

6. A method for perforating the casing of a well as recited in claim 1 further including the steps of:

(a) explosively disconnecting said wireline from said perforator means, and (b) removing said wireline from said tubing string.

7. A method for perforating the casing of a well as recited in claim 1 wherein the step of depositing said perforator means comprises lowering said perforator means into said casing by means of a wireline.

8. A method for perforating the casing of a well as recited in claim 1 wherein the step of positioning said perforator means comprises locating collars of said casing traversed by said perforator means.

9. A method for perforating the casing of a well at a predetermined strata with a casing perforator, comprising the steps of:

(a) lowering said casing perforator through said casing [to a level below said strata] by means of a wireline, (b) disconnecting said wireline from said casing perforator, (c) removing said wireline from said casing, (d) installing a tubing string in said casing with a packer joined to the lower end of said tubing string, (e) positioning said tubing string to locate said packer and the lower end of said tubing string above said strata, (f) setting said packer to isolate a borehole annulus above said packer from a borehole space below said packer, (g) running a wireline and an electrical conductor through said tubing string, (h) joining said wireline and said electrical conductor to said casing perforator, (i) positioning said casing perforator at the level of said strata by means of said wireline, (j) activating said casing perforator by means of said electrical conductor, (k) disconnecting said wireline and said electrical conductor from said casing perforator, and (l) removing said wireline and said electrical conductor from said tubing string.

10. A method for perforating the casing of a well as recited in claim 9 further including the steps of swabbing said tubing to remove fluid from said well.

11. A method for perforating the casing of a well as recited in claim 9 further including the step of removing fluid from said tubing and said casing by displacing said fluid with a gas.

12. A method for perforating the casing of a well as recited in claim 9 wherein the step of positioning said casing gun comprises counting collars of said casing traversed by said casing gun.

13. A method for perforating the casing of a well as recited in claim 9 wherein the step of disconnecting said wireline and said electrical conductor from said casing gun comprises an explosive decoupling.

* * * * *